CONSTANT BANDWIDTH COUPLING SYSTEM

Filed Oct. 3, 1952 2 Sheets-Sheet 1

INVENTOR.
STEPHEN W. MOULTON
BY
Deen V. Hayestine
ATTORNEY

INVENTOR.
STEPHEN W. MOULTON
BY
Allen V. Hazeltine
ATTORNEY

United States Patent Office 2,756,393

Patented July 24, 1956

2,756,393

CONSTANT BANDWIDTH COUPLING SYSTEM

Stephen W. Moulton, Hatboro, Pa., assignor to Philco Corporation, Philadelphia, Pa., a corporation of Pennsylvania Application October 3, 1952, Serial No. 312,987

11 Claims. (Cl. 333—27)

This invention relates to electrical coupling circuits and more particularly to coupling circuits having constant bandwidth over a very wide range of frequencies.

In the field of electronics it is frequently necessary to couple a circuit element having substantially constant resistance as a function of frequency to a tuned inductor-capacitor tank circuit. This circuit element may be a source of energy—for example a receiving antenna; or a load—for example a transmitting antenna or a crystal mixer. Coupling to the tank circuit may be accomplished by connecting the circuit element directly across a portion of the inductor or by providing a coupling loop magnetically linked to the inductor. It might be assumed that, if the resistance of the circuit element does not change with frequency, then it will have no effect on the bandwidth of the tank circuit. It can be demonstrated, however, that such is not the case and that the bandwidth, instead of remaining constant, actually varies as the square of the frequency of operation. This change in bandwidth can be tolerated and is, in fact, often overlooked in circuits operating over relatively narrower ranges of frequency. However, the serious nature of this problem in circuits operating over a wide range of frequencies is clearly indicated by the following specific and practical example.

The ultrahigh-frequency band assigned to television broadcasting extends from 470 megacycles to 890 megacycles, a range of almost 2 to 1 in terms of frequency change. The resistive component of the impedance of a properly designed U. H. F. antenna remains substantially constant at 300 ohms over the entire band. This antenna is coupled directly to a tuned inductor-capacitor tank circuit in the U. H. F. tuner. Therefore, if this tank circuit is designed to have the proper bandwidth to pass the television signal at the high frequency end of the passband, for example on channel 83, then it will have only one-fourth the required bandwidth on the low frequency end of the U. H. F. band, for example on channel 14. This could be overcome by providing a plurality of tank circuits to cover the U. H. F. band but this is highly undesirable in terms of reliability of the system in the hands of the viewer and especially in terms of economy of manufacture.

The use of a separate coupling loop in a tuner at ultrahigh frequency is highly undesirable since it greatly increases stray coupling between the input and output circuits of the tuner and adds materially to the cost of constructing the tuner.

The problems mentioned above appear in the design of other systems operating in the ultrahigh-frequency range and in systems at all frequencies where it is necessary to couple a source or load of constant or substantially constant resistance to a tank circuit and still maintain constant bandwidth. At frequencies below the U. H. F. band it is possible to compensate for the change in bandwidth by including a suitable $\tau$ or $\pi$ filter network between the source and the tank circuit. This solution is uneconomical at low frequencies and entirely impractical at ultrahigh frequencies. A very similar problem is also encountered where the load has a substantially constant resistive component and a reactive component that varies with frequency.

Therefore, it is an object of the present invention to provide means for coupling a circuit element to a tank circuit, the characteristic of the coupling means being such that the bandwidth of the system remains substantially constant over a wide frequency range.

It is a further object of the present invention to provide a coupling circuit particularly well adapted for coupling a circuit element to a tank circuit at ultrahigh frequencies.

Another object of the present invention is to provide a simple, reliable and inexpensive coupling circuit for U. H. F. television tuners.

A further object is to provide a coupling circuit that may be constructed entirely of stock components.

These and other objects of the invention which will appear as the description of the invention proceeds are generally accomplished by employing a frequency sensitive impedance transformer between the circuit element and the tank circuit, the characteristic for the impedance transformer being such that the impedance of the circuit element, whether a source or a load, appears as a substantially constant resistance in series with the inductance of the tank circuit. In a preferred form of the invention the impedance transformer may be a section of transmission line having the characteristic impedance, length and points of connection hereinafter specified.

I am aware that impedance transformers have been used to couple circuit elements to tank circuits and that transmission lines have been used as impedance transformers. However, the impedance transformers of the prior art are essentially fixed frequency, or at most, very narrow band devices which have a fixed impedance transformation ratio. I am also aware that constant bandwidth circuits have been devised using vacuum tube amplifier stages with specially designed feedback and biasing circuits. However, there has been no appreciation in the art of the fact that unexpectedly superior performance of wide band coupling circuits may be secured by so relating the frequencies of operation, the length of coupling transmission line and the impedances of the various elements of the coupling system that an impedance transformation ratio that varies as a nonlinear function of the frequency of operation is achieved. It is this novel concept that forms the basis of the present invention.

For a better understanding of the invention together with other and further objects thereof, reference should now be made to the following detailed description which is to be read in conjunction with the accompanying drawings in which.

Figures 1, 2:
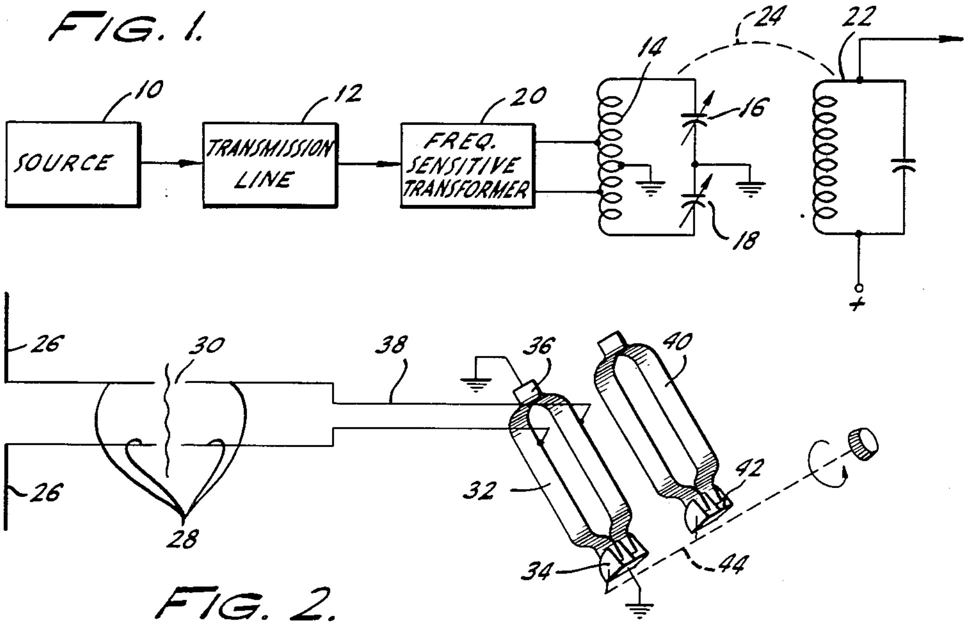
Fig. 1 is a diagram, partially in block form, illustrating the general nature of the invention.
Fig. 2 is a schematic diagram of a preferred embodiment of the invention adapted for operation in the ultrahigh-frequency band.

Turning now specifically to Fig. 1, block 10 represents a source of signals having a resistive component of characteristic impedance that is substantially independent of the frequency of the signal supplied. Again, a properly designed television antenna operating in the ultrahigh-frequency band is a convenient example although many other sources exhibiting this property are well known to those versed in the electronic art. It would be well to keep in mind that what is said regarding source 10 applies equally to a load—for example the same antenna employed as a transmitting antenna.

In a normal circuit source 10 will be located at some distance from the tank circuit and will be connected thereto by a section of transmission line having identically the same characteristic impedance as source 10 in order to minimize standing waves in the transmission line. Therefore, in order that Fig. 1 may represent a practical embodiment, this transmission line is included as block 12.

The end of transmission line 12 remote from source 10 is coupled to the tank circuit composed of tapped inductor 14 and capacitors 16 and 18 by a frequency sensitive impedance transformer 20. It will become clear as the description of the invention proceeds that transformer 20 may be of the type having primary and secondary windings but, for reasons of simplicity, economy and reliability, is preferably formed of a section of transmission line operating under the conditions hereinafter described in detail. In either case, the impedance transformer 20 has its input terminals connected across the transmission line 12 and its output terminals connected to appropriate taps on inductor 14. In the embodiment shown in Fig. 1, the tank circuit is balanced with respect to ground. This condition is not essential to the proper operation of the present invention. A second tank circuit 22 magnetically coupled to the first tank circuit, as shown by broken line 24, is included in Fig. 1 for the sole purpose of illustrating a preferred method of deriving a signal from the first tank circuit composed of inductor 14 and capacitors 16 and 18. A description of the manner in which the system of Fig. 1 operates is deferred until after the description of Fig. 2 since a description of the mode of operation of one embodiment will suffice for all the embodiments shown in the drawings with the possible exception of the embodiment of Fig. 7.

Briefly describing Fig. 2 then, 26 represents an antenna having a constant impedance of say 300 ohms from a frequency of 470 megacycles to 890 megacycles, the two limits of the U. H. F. band assigned to television. Transmission line 28 has a characteristic impedance substantially equal to the impedance of antenna 26. The break at 30 is included to indicate that the length of transmission line 28 is immaterial. At ultrahigh frequencies inductor 14 comprises a single loop or hairpin-shaped piece of copper bar 32 measuring, for example, 1/16" by 3/8" in cross-section. Capacitors 16 and 18 are formed by the ends of bar 32 and a multiplate rotor 34. A projection 36 may be provided on inductor 32 as a means of supporting the inductor. The appropriate ground connections are made to the tank circuit at projection 36 and rotor 34. Transmission line 38 corresponds to frequency sensitive transformer 20 of Fig. 1. By reason of the reduced spacing between the parallel conductors comprising transmission line 38, the latter has a lower characteristic impedance than transmission line 28. The preferred values for the length and characteristic impedance of transmission line 38 are given below in connection with the description of the operation of the embodiment of Fig. 2. The two conductors forming transmission line 38 are soldered or otherwise electrically connected to inductor 32 at points adjacent the closed end thereof as shown in Fig. 2. This has the same effect at ultrahigh frequencies as tapping a multiturn inductor has at lower frequencies. Inductor 40 and rotor 42 make up a secondary tank circuit. Coupling between the two tank circuits is provided by placing the two inductors in parallel relationship at a spacing of 1/2" to 2". Rotors 34 and 42 are ganged, as indicated by the broken line 44, to permit the tank circuits to be tuned in synchronism over the desired frequency band.

The description of the operation of the embodiments of Figs. 1 and 2 includes a rather detailed discussion of Figs. 3 through 6 so that a separate description of these figures is believed to be unnecessary.

Figure 3A:
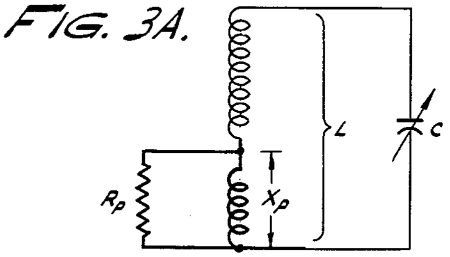
Figs. 3A and 3B are explanatory diagrams employed in describing the manner in which the invention operates.

Fig. 3A is an equivalent circuit of the arrangement of Fig. 1 with transformer 20 removed. L represents the total inductance of the tank circuit and C the total capacitance. $X_p$ is the inductive reactance between the points of connection of the two conductors of transmission line 12. It may be assumed that L, C and $X_p$ contain negligible resistive components. $R_p$ represents the impedance of source 10 transferred directly to the tank circuit by the matched transmission line 12.

Figure 3B:
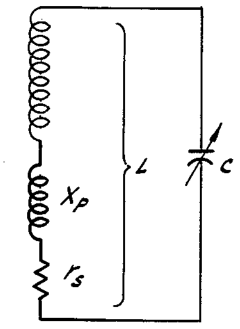

If $X_p^2$ is much smaller than $R_p$—and it may be made so by tapping the inductor at the proper point—then the circuit of Fig. 3A may be redrawn as Fig. 3B, where:

$$(1) \qquad r_s=\frac{X_p^2}{R_p}$$

From the two known equations for the quality factor Q of the tank circuit:

$$(2) \qquad Q=\frac{\omega L}{r_s}$$

and $$(3) \qquad Q=\frac{\omega}{\text{B.W.}}$$

where $\omega$ represents the center frequency to which the tank circuit is tuned and B. W. represents the bandwidth of the tank circuit. In accordance with the conventional definition of this term, it can be shown that:

$$(4) \qquad \text{Bandwidth}=\frac{r_s}{L}$$

From this relationship it can be seen that, if $r_s$ is constant, then the bandwidth will remain constant since L is assumed to be a pure inductance which does not change with frequency. Conversely, it appears from Equation 1 that if $R_p$ remains constant, as it would without impedance transformer 20, then the bandwidth will vary as the square of the frequency since $X_p$ varies directly with frequency and $X_p^2$ as the square of the frequency. This condition is illustrated by the broken curve 50 of Fig. 6.

Figure 4:
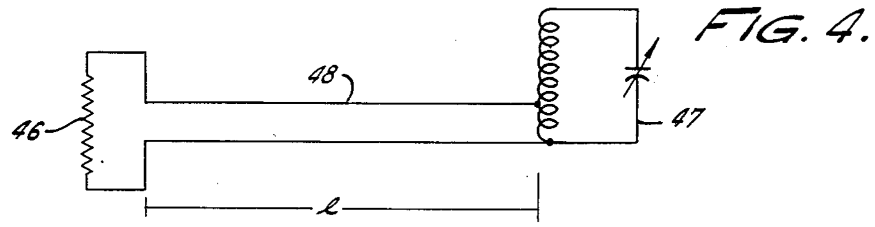
Fig. 4 is a lower frequency equivalent circuit of the embodiment of Fig. 2.

If $R_p$, instead of remaining constant, is caused to vary as the square of the frequency, then, as indicated by Equations 1 and 4, $r_s$ and the bandwidth will remain constant. Therefore, the limits to be imposed on transformer 20 may now be specified. Transformer 20 must reflect the input impedance as an output impedance having a resistive component that varies as the square of the frequency, and the output impedance must be large compared to the impedance across which it is connected. Fig. 4 shows the circuit of Fig. 3A with an impedance transformer inserted between the source, represented by resistor 46, and the tank circuit 47. This transformer is a section of transmission line 48 having a characteristic impedance less than the resistance of source 46 and having a length *l*. It will be recognized that the circuit of Fig. 4 is also the equivalent of the embodiment shown in Fig. 2 since resistor 46 corresponds to antenna 26 and matched line 28, and line 48 corresponds to line 38.

Figures 5, 6:
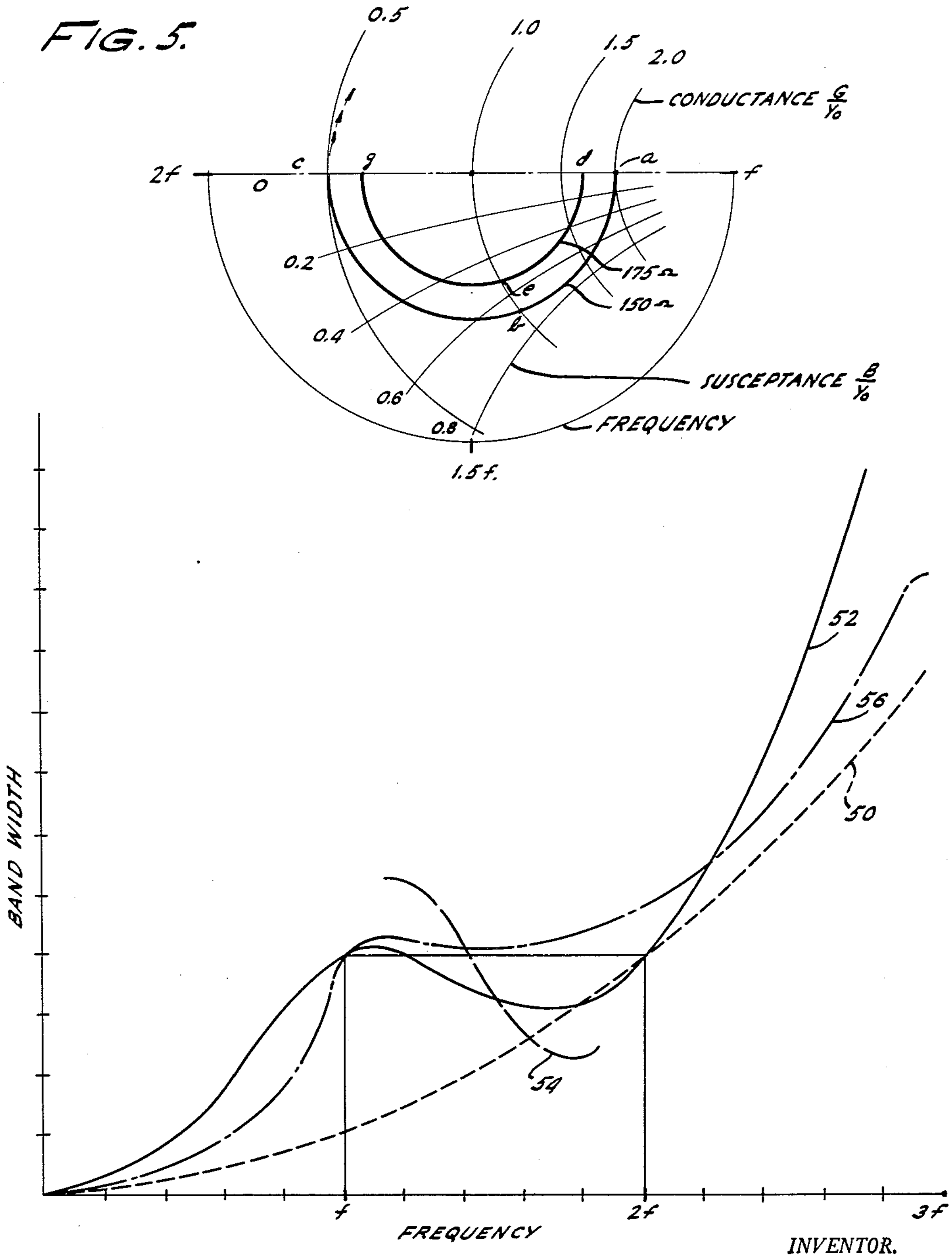
Fig. 5 is an impedance chart in the form known in the art as a "Smith chart"
Fig. 6 is a plot of bandwidth versus frequency for certain typical embodiments of the present invention.

Attention is now invited to the impedance diagram of Fig. 5. Those unfamiliar with this type of impedance plot may refer to Electronics, volume 17, No. 1, page 130, McGraw-Hill Book Company, Inc., January 1944 for a detailed explanation. Returning to the original values assumed for the embodiment of Fig. 2, it will be seen that if resistor 46 has a resistance of 300 ohms (corresponding to the impedance of antenna 26 and transmission line 28) and if transmission line 48 (representing transmission line 38) has a characteristic impedance of 150 ohms and a length *l* equal to one-quarter wavelength at a frequency of 470 megacycles (which we may represent by $f$), then the impedance of line 38, as seen from the end connected to inductor 32, will be represented by the line $a$—$b$—$c$ of Fig. 5. At 470 megacycles the impedance as seen from tank circuit 47 equals 150/2 or 75 ohms. At a frequency of $2f$=940 megacycles, a frequency above the upper limit of the ultrahigh-frequency band assigned to television, the impedance as seen by tank circuit 47 is 150/.5=300 ohms. Therefore, at the two limits, the impedance varies as the square of the frequency. It can be shown that, between the limits $f$ and $2f$, $R_p$ varies approximately as the square of the frequency so that the bandwidth, while not remaining exactly constant, follows the curve 52 which is much more nearly a horizontal line representing a constant bandwidth than is curve 50. It should be noted, however, that this relationship holds true only if the length of the transmission line 48 in Fig. 4 or 38 in Fig. 2 varies between $\lambda/4$ and $\lambda/2$ as it will for a frequency variation from $f$ to $2f$. Below $f$ and above $2f$ the resistance $R_p$ decreases with an increase in frequency, thus causing a very rapid change in $r_s$ and in the bandwidth. It can be demonstrated that a second plateau will appear in curve 52 between frequencies of $3f$ and $4f$ but this represents a much smaller percentage change in frequency than from $f$ to $2f$.

The selection of 150 ohms or, more generally, one-half the impedance of source 10 or antenna 26, is not an arbitrary one. It will be seen from Fig. 5 that this is the only value that gives a four-to-one change in impedance for a two-to-one change in frequency. If the characteristic impedance of line 38 is made less than one-half the characteristic impedance of the source, then the bandwidth variation will take the form shown by curve 54. If the characteristic impedance is increased above one-half that of the source, the variation will approach that of curve 50. However, some slight improvement over curve 52 for a limited range may be obtained by increasing slightly the characteristic impedance of line 38. Line $d$—$e$—$g$ and curve 56 of Figs. 5 and 6 respectively represent the impedance and bandwidth variations for a characteristic impedance equal to $4/7$ that of the source. This curve is flatter than curve 52 over the region $f$ to $1.5f$ or even $1.8f$, but then increases with increasing frequency.

Therefore, for a substantially constant bandwidth over a maximum range of frequency, the transmission line forming the impedance transformer should have a length equal to a quarter wavelength at the lower frequency limit and a characteristic impedance of from one-half to two-thirds the impedance of the terminating source or load. The line is preferably connected directly to the inductor at a point such that $X_p$ is small compared to the input impedance at the lower frequency limit.

The practical aspects of the embodiment employing a transmission line as an impedance transformer should not be overlooked. At ultrahigh frequencies the transmission line forming the impedance transformer is only 4¾″ long and approximately ¼″ wide. It is electrically connected to the circuit and mechanically supported by soldering the two conductors to the inductor at one end and to the antenna lead at the other. This not only simplifies construction and eliminates the need for an input coupling loop but also substantially reduces the direct coupling between the input and the secondary tank circuit.

Figure 7:
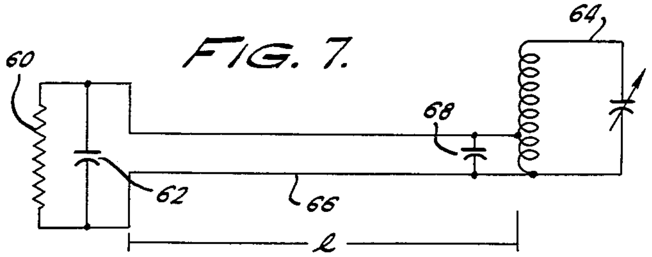
Fig. 7 is a diagram of a second preferred embodiment of the present invention.

In the above-described example, it was assumed that the terminating impedance is purely resistive and independent of frequency. While this is a reasonable and practical assumption in many instances, there are loads, for example crystal detectors, that have an appreciable reactive component. A typical crystal may have a capacity of 1 micromicrofarad which, at 500 megacycles, represents a reactive component greater than 300 ohms. It has been found that the effect of this reactive component may be overcome by shortening the line forming the impedance transformer and adding a reactor across $X_p$ having the same order of magnitude as the reactive component of the load. This embodiment of the invention is illustrated in Fig. 7. In this figure, resistor 60 and capacitor 62 represent the resistive and capacitive components of a load. The tank circuit 64 is connected to the load by transmission line 66 which is shunted, at the end nearest tank circuit 64, by a capacitor 68. By way of a typical example, the following values were found to give a passband within the limits of 17.6 to 20.6 megacycles over a range of frequencies from 470 megacycles to 950 megacycles.

| | |
|---|---|
| Load resistance | 250 ohms. |
| Load capacitance (shunt) | 1$\mu\mu$f. |
| Characteristic impelance of line **66** | 250 ohms. |
| Length of line **66** | 0.135$\lambda$ at 500 mc. |
| Capacitor **68** | 1.5$\mu\mu$f. |

The relationship between the embodiment of Fig. 7 and the embodiments of Figs. 1 and 2 may be more fully appreciated if it is remembered that the addition of shunt capacitance to the two ends of a length of transmission line that is short compared to a wavelength has the effect of lowering its characteristic impedance and increasing its electrical length. Therefore, the combination of capacitors 62 and 68 and transmission line 66 is substantially equivalent to a transmission line falling within the limits specified for transmission line 38 of Fig. 2.

If the reactance between the tapping points on the inductor is made very small, capacitor 68 may be omitted since it is in shunt with the inductance between the tapping points.

It is obvious that various changes and modifications may be made in the embodiments herein shown and described without departing from the true spirit and scope of the invention as defined by the hereinafter appended claims. One obvious modification is to practice the invention at a frequency below the ultrahigh-frequency band. The limit in this direction is reached only when the transmission line forming the impedance transformer is impractically long. At such frequencies lumped constant equivalents of the transmission line may be substituted. Another obvious modification is to substitute a waveguide for transmission line 38, for example and a tunable cavity resonator for the tuned inductor-capacitor tank circuit.

What is claimed is:

1. For use in combination with a circuit element comprising a source or a load, a coupling network having a substantially constant bandwidth over a two-to-one range of frequencies, said coupling network comprising an inductor, a variable capacitor connected in shunt therewith and adapted to tune said shunt inductor-capacitor combination over said range of frequencies, and a section of two-conductor transmission line connected at one end to two spaced taps on said inductor, the opposite end of said transmission line being adapted for connection to said circuit element, the length of said transmission line being not greater than a half wavelength at the highest frequency of said range, the characteristic impedance of said line being approximately one-half to two-thirds the impedance of said circuit element, and the reactance between said two spaced taps being sufficiently small compared to the characteristic impedance of said transmission line so that the coupling network may be considered as comprising the reactance between said two spaced taps in series with a resistance equal to the square of the reactance between the spaced taps divided by the impedance of said transmission line as seen from said spaced taps.

2. A coupling network having a substantially constant bandwidth over a two-to-one frequency range when coupled to a circuit element comprising a source or a load having an inductive component of impedance substantially equal to the resistive component at the lowest frequency in said range, said coupling network comprising an inductor, a variable capacitor connected in shunt with said inductor and adapted to tune said shunt inductor-capacitor combination to resonance over said range of frequencies, a section of a two-conductor transmission line connected at one end to two spaced taps on said inductor, the opposite end of said transmission line being adapted for connection to said circuit element, the length of said transmission line lying between one-eighth and one-quarter wavelength at the lowest frequency within said range, the characteristic impedance of said line being approximately one-half to two-thirds the impedance of said circuit element, and the reactance between said two spaced taps being sufficiently small compared to the characteristic impedance of said transmission line so that the coupling network may be considered as comprising the reactance between said two spaced taps in series with a resistance equal to the square of the reactance between the spaced taps divided by the impedance of said transmission line as seen from said spaced taps, and a reactor connected in shunt with the first-mentioned end of said transmission line, said reactor having a reactance of the same sign and approximately the same magnitude as the reactive component of said circuit element.

3. A coupling network having a substantially constant bandwidth over a two-to-one frequency range when coupled to a circuit element comprising a source or a load having a capacitive component of impedance substantially equal to the resistive component at the lowest frequency of said range, said coupling circuit comprising an inductor, a variable capacitor connected in shunt with said inductor and adapted to tune said shunt inductor-capacitor combination to resonance over said range of frequencies, a section of a two-conductor transmission line connected at one end to two spaced taps on said inductor, the opposite end of said transmission line being adapted for connection to said circuit element, said transmission line having a length approximately equal to one-eighth of a wavelength at the lowest frequency in said range, the characteristic impedance of said line being approximately equal to the resistive component of the impedance of said circuit element and the reactance between said two spaced taps being sufficiently small compared to the characteristic impedance of said transmission line so that the coupling network may be considered as comprising the reactance between said two spaced taps in series with a resistance equal to the square of the reactance between the spaced taps divided by the impedance of said transmission line as seen from said spaced taps, and a capacitor connected in shunt with the first-mentioned end of said transmission line, said capacitor having a capacitance approximately one and one-half times the shunt capacitance of said circuit element.

4. For use with a circuit element comprising a source or load having a substantially constant resistance over a two-to-one range of frequencies, a coupling circuit tunable over said range with a substantially constant bandwidth, said coupling circuit comprising an inductor, a variable tuning capacitor connected in shunt with said inductor, and a section of a two-conductor transmission line connected at one end to two spaced taps on said inductor and adapted for connection to said circuit element at the opposite end thereof, the length of said transmission line being substantially a quarter wavelength at the lowest frequency of said two-to-one range, the impedance of said transmission line lying within the range of one-half to two-thirds the impedance of said circuit element, the reactance between said two spaced taps being sufficiently small compared to the characteristic impedance of said transmission line so that the coupling circuit may be considered as comprising the reactance between said two spaced taps in series with a resistance equal to the square of the reactance between the spaced taps divided by the impedance of said transmission line as seen from said spaced taps.

5. A coupling network having a substantially constant bandwidth over a wide frequency range when connected to a circuit element having a substantially constant resistance, said coupling circuit comprising an inductor, a variable tuning capacitor connected in shunt with said inductor and adapted to tune said shunt inductor-capacitor circuit to resonance over said frequency range, and a section of two-conductor transmission line connected at one end to two spaced taps on said inductor, the opposite end of said transmission line being adapted for connection to said circuit element, the length of said transmission line being such that the input impedance thereof as seen from said two spaced taps with said opposite end connected to said circuit element increases with increasing frequency throughout said frequency range, the impedance of said transmission line lying within the range of one-half to two-thirds the impedance of said circuit element, and the reactance between said two spaced taps being sufficiently small compared to the characteristic impedance of said transmission line so that the coupling network may be considered as comprising the reactance between said two spaced taps in series with a resistance equal to the square of the reactance between the spaced taps divided by the impedance of said transmission line as seen from said spaced taps.

6. A coupling network having a substantially constant bandwidth over a wide frequency range when connected to a circuit element having a substantially constant conductance, said coupling circuit comprising an inductor, a variable tuning capacitor connected in shunt with said inductor and adapted to tune said shunt inductor-capacitor circuit to resonance over said frequency range, and a section of a two-conductor transmission line connected at one end to two spaced taps on said inductor, the opposite end of said transmission line being adapted for connection to said circuit element, the length of said transmission line being such that the conductance thereof as seen from said two spaced taps decreases with increasing frequency throughout said frequency range with said opposite end connected to said circuit element, the impedance of said transmission line being such as to cause a substantially flat plateau to occur in the bandwidth versus frequency characteristic of said coupling network, the reactance between said two spaced taps being sufficiently small so that the coupling network may be considered as comprising the reactance between said two spaced taps in series with a resistance equal to the square of the reactance between the spaced taps divided by the impedance of said transmission line as seen from said spaced taps.

7. A coupling network having a substantially constant bandwidth over a wide frequency range when connected to a circuit element having a substantially constant resistance, said coupling circuit comprising a resonant element tunable over said frequency range, electromagnetic energy transmission means connected at one end to said resonant element and at the opposite end to said circuit element, the length of said transmission means being such that the input resistance thereof as seen from said resonant element increases with increasing frequency throughout said frequency range, the impedance of said transmission means being such as to cause a substantially flat plateau to occur in the bandwidth versus frequency characteristic of said coupling network, the reactance between said two spaced taps being sufficiently small so that the coupling network may be considered as comprising the reactance between said two spaced taps in series with a resistance equal to the square of the reactance between the spaced taps divided by the impedance of said transmission line as seen from said spaced taps.

8. A coupling network having a substantially constant bandwidth over a wide frequency range when connected to a circuit element having a substantially constant conductance, said coupling circuit comprising an inductor, a variable tuning capacitor connected in shunt with said inductor and adapted to tune said shunt inductor-capacitor circuit to resonance over said frequency range, a second circuit element magnetically coupled to said inductor so as to permit the interchange of energy therebetween, and a section of a two-conductor transmission line connected to two spaced taps on said inductor, the reactance between said spaced taps being sufficiently small compared to the characteristic impedance of said transmission line so that the coupling network may be considered as comprising the reactance between said two spaced taps in series with a resistance equal to the square of the reactance between the spaced taps divided by the impedance of said transmission line as seen from said spaced taps, the opposite end of said transmission line being adapted for connection to said first-mentioned circuit element, the length and characteristic impedance of said transmission line being such that the impedance of said first-mentioned circuit element is reflected as a substantially constant equivalent series resistance in said shunt inductor-capacitor circuit.

9. A coupling network having a substantially constant bandwidth over a wide frequency range when connected to a circuit element said coupling circuit comprising an inductor, a variable tuning capacitor connected in shunt with said inductor and adapted to tune said shunt inductor-capacitor circuit to resonance over said frequency range, a second circuit element magnetically coupled to said inductor so as to permit the interchange of energy therebetween, and an impedance transformer having a pair of output terminals connected to two spaced taps on said inductor and a pair of input terminals adapted for connection to said first-mentioned circuit element, the reactance between said two spaced taps being sufficiently small compared to the characteristic impedance as seen from said output terminals of said transformer so that the coupling network may be considered as comprising the reactance between the spaced taps in series with a resistance equal to the square of the reactance between the spaced taps divided by the impedance as seen from said output terminals, said impedance transformer being constructed and arranged to cause the impedance of said first-mentioned circuit element to be reflected as a substantially constant equivalent series resistance in said shunt inductor-capacitor circuit.

10. A coupling network adapted for use in the ultra-high-frequency range, said coupling circuit having a substantially constant bandwidth over a two-to-one range of frequencies when connected to a first circuit element of having a substantially constant resistance, said coupling circuit comprising a single turn inductor formed of a substantially U-shaped copper strap, a capacitor rotor having at least one movable plate capacitively associated with the two ends of said U-shaped strap, said strap and said rotor together forming a tank circuit tunable over said two-to-one frequency range, a second circuit element non-conductively coupled to said tank circuit so as to permit the interchange of energy therebetween, and a section of two-conductor transmission line connected at one end to two points on said strap adjacent the closed end thereof, the reactance between said last-mentioned two points being sufficiently small so that the coupling network may be considered as comprising the reactance between said two spaced taps in series with a resistance equal to the square of the reactance between the two points divided by the impedance of said transmission line as seen from said spaced taps the opposite end of said transmission line being adapted for connection to said first-mentioned circuit element, the length of said transmission line being substantially one-half a wavelength at the highest frequency in said two-to-one range, and the characteristic impedance of said transmission line being from approximately one-half to two-thirds the impedance of said first circuit element.

11. A coupling network having a substantially constant bandwidth over a wide frequency range when connected to a circuit element having a substantially constant resistance, said coupling circuit comprising a resonant element tunable over said frequency range, electromagnetic energy transmission means connected at one end to said resonant element and at the opposite end to said circuit element, the length of said transmission means being substantially a quarter wavelength at the lowest frequency of said range, the impedance of said transmission means lying within the range of one-half to two-thirds the impedance of said circuit element, the reactance across the transmission means at the point of connection to said resonant element being sufficiently small compared to the characteristic impedance of said transmission means so that the coupling network may be considered as comprising the reactance between said two spaced taps in series with a resistance equal to the square of the reactance between the spaced taps divided by the impedance of said transmission line as seen from said spaced taps.

References Cited in the file of this patent

UNITED STATES PATENTS

| | | |
|---|---|---|
| 2,036,381 | Zinn | Apr. 7, 1936 |
| 2,106,776 | Trevor et al. | Feb. 1, 1938 |
| 2,111,743 | Blumlein et al | Mar. 22, 1938 |
| 2,139,055 | Wright et al. | Dec. 6, 1938 |
| 2,194,696 | Eickemeyer et al. | Mar. 26, 1940 |
| 2,267,445 | Cork et al. | Dec. 23, 1941 |
| 2,396,708 | Leeds | Mr. 19, 1946 |
| 2,419,985 | Brown | May 6, 1947 |
| 2,467,737 | Germer | Apr. 19, 1949 |
| 2,644,927 | Dishal et al. | July 7, 1953 |